US008812205B2

(12) United States Patent
Tsuda et al.

(10) Patent No.: US 8,812,205 B2
(45) Date of Patent: Aug. 19, 2014

(54) SHIFT CONTROL APPARATUS AND TRANSMISSION APPARATUS

(75) Inventors: Kohei Tsuda, Anjo (JP); Yoichi Tajima, Anjo (JP); Tomokazu Ito, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 838 days.

(21) Appl. No.: 13/039,797

(22) Filed: Mar. 3, 2011

(65) Prior Publication Data

US 2011/0238274 A1 Sep. 29, 2011

(30) Foreign Application Priority Data

Mar. 29, 2010 (JP) .................................. 2010-075818

(51) Int. Cl.
*F16H 59/00* (2006.01)
*F16H 59/68* (2006.01)
*F16H 61/08* (2006.01)
*F16H 61/06* (2006.01)
*F16H 61/686* (2006.01)
*F16H 59/70* (2006.01)

(52) U.S. Cl.
CPC .............. *F16H 61/08* (2013.01); *F16H 61/061* (2013.01); *F16H 61/686* (2013.01); *F16H 2059/702* (2013.01)
USPC .............. 701/58; 701/68; 192/3.57; 192/3.58

(58) Field of Classification Search
CPC ........................... F16H 2059/702; F16H 61/08
USPC ...................................................... 701/58, 68
See application file for complete search history.

(56) References Cited

U.S. PATENT DOCUMENTS

| | | | | |
|---|---|---|---|---|
| 4,905,545 A | * | 3/1990 | Leising et al. | ................ 477/133 |
| 5,138,906 A | * | 8/1992 | Iwatsuki et al. | ................ 477/152 |
| 6,616,560 B2 | | 9/2003 | Hayabuchi et al. | |
| 2001/0003322 A1 | | 6/2001 | Kon et al. | |
| 2005/0245351 A1 | * | 11/2005 | Yamada et al. | ................ 477/110 |

(Continued)

FOREIGN PATENT DOCUMENTS

| | | |
|---|---|---|
| JP | A-10-103494 | 4/1998 |
| JP | A-11-257482 | 9/1999 |

(Continued)

OTHER PUBLICATIONS

May 17, 2011 International Search Report issued in PCT/JP2011/052493 (with translation).

*Primary Examiner* — Khoi Tran
*Assistant Examiner* — Ryan Rink
(74) *Attorney, Agent, or Firm* — Oliff PLC

(57) ABSTRACT

A shift control apparatus controlling a stepped transmission. The apparatus is configured with a gear ratio setting unit, and a shift speed change determining unit. A shift speed change predicting unit predicts in advance a change of shift speed by the shift speed change determining unit based on the set gear ratio, a rate of change in the set gear ratio, and an engagement preparation time which is a time needed for engagement preparation of the friction engagement element. A shift control unit controls a hydraulic actuator so that engagement preparation of a friction engagement element to be engaged is performed when a change of shift speed is predicted, and controls the hydraulic actuator so that a hydraulic pressure needed for engaging the friction engagement element is supplied to a hydraulic servo when a change of shift speed is determined by the shift speed change determining unit.

8 Claims, 12 Drawing Sheets

(56) References Cited

U.S. PATENT DOCUMENTS

2008/0242464 A1* 10/2008 Kumazaki et al. ............ 475/136
2010/0018833 A1*  1/2010 Cao et al. .................... 192/85 R
2010/0332091 A1* 12/2010 Kato et al. ...................... 701/58

FOREIGN PATENT DOCUMENTS

| JP | A-2001-165290 | 6/2001 |
| JP | A-2002-195402 | 7/2002 |
| JP | A-2008-275001 | 11/2008 |

* cited by examiner

FIG. 2

|   |   | C-1 | C-2 | C-3 | B-1 | B-2 | F-1 |
|---|---|---|---|---|---|---|---|
| P |   |   |   |   |   |   |   |
| REV |   |   |   | ○ |   | ○ |   |
| N |   |   |   |   |   |   |   |
| D | 1st | ○ |   |   |   | ● | ○ |
|   | 2nd | ○ |   |   | ○ |   |   |
|   | 3rd | ○ |   | ○ |   |   |   |
|   | 4th | ○ | ○ |   |   |   |   |
|   | 5th |   | ○ | ○ |   |   |   |
|   | 6th |   | ○ |   | ○ |   |   |

○ ENGAGED, ● ENGAGED DURING ENGINE BRAKING

F I G . 11
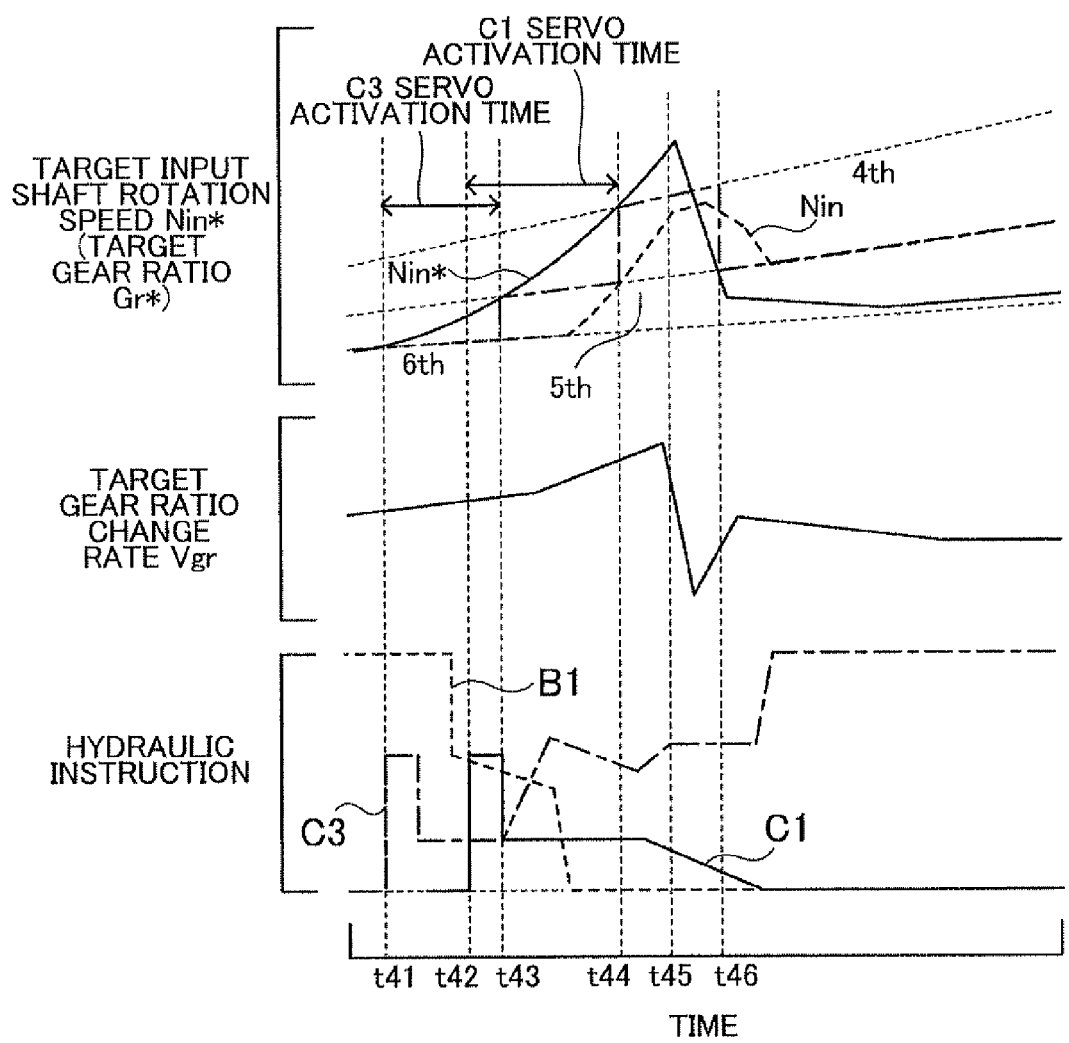

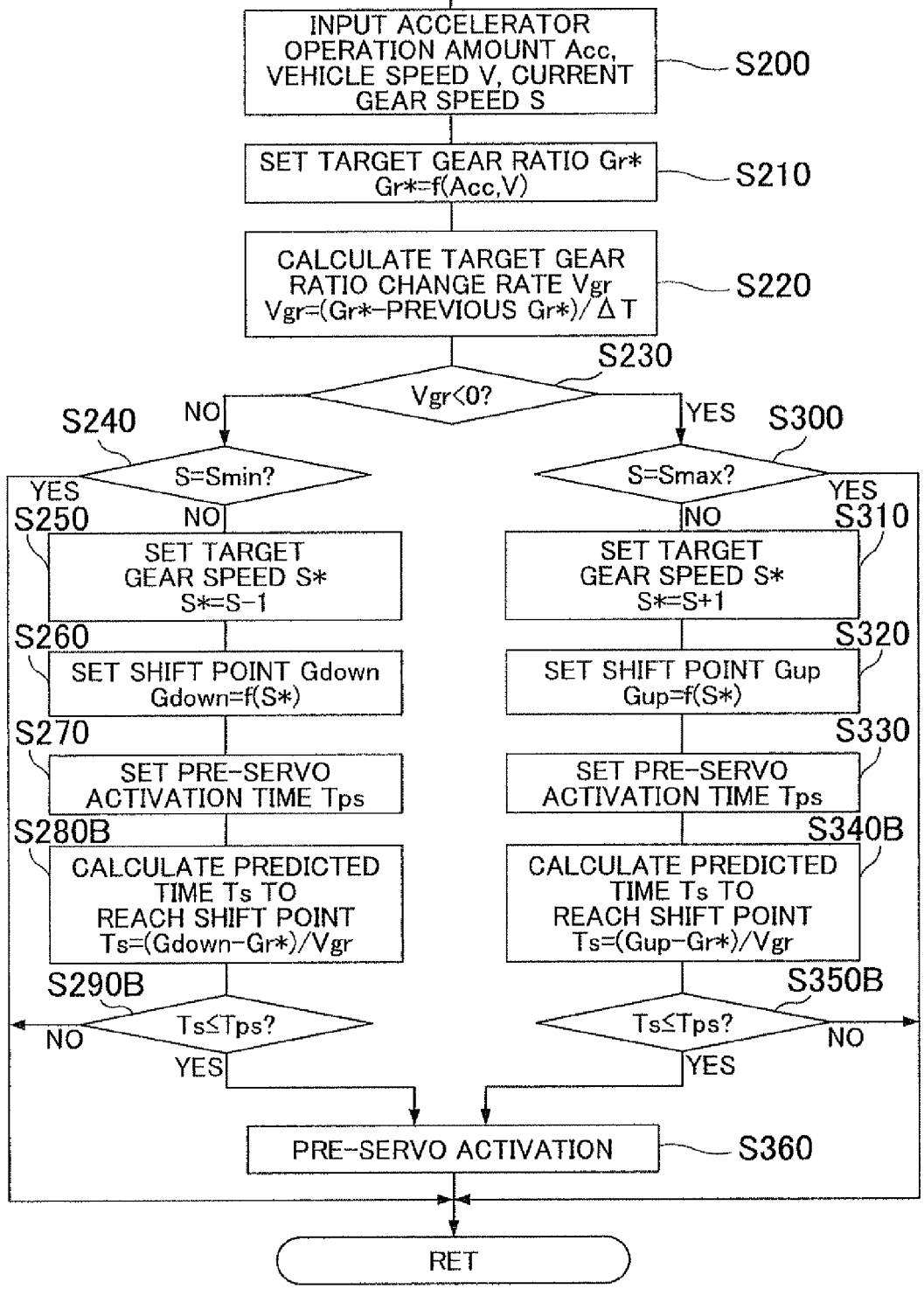

SHIFT CONTROL APPARATUS AND TRANSMISSION APPARATUS

INCORPORATION BY REFERENCE

The disclosure of Japanese Patent Application No. 2010-075818 filed on Mar. 29, 2010 including the specification, drawings and abstract is incorporated herein by reference in its entirety.

BACKGROUND OF THE INVENTION

The present invention relates to a shift control apparatus controlling a stepped transmission that is mounted in a vehicle and changes a shift speed by switching an engagement state of a friction engagement element by driving a hydraulic actuator, and also relates to a transmission apparatus.

DESCRIPTION OF THE RELATED ART

In the related art, as a shift control apparatus of this type, there has been proposed an apparatus that determines a shift point based on a deceleration of a vehicle and a time required for a first quick fill during coast-down, and determines shifting by comparing the determined shift point with an output shaft rotation speed (see, for example, Japanese Patent Application Publication No. JP-A-H11-257482).

Further, for a six-speed stepped transmission which needs to engage and release four engagement elements in 6-3 shifting to downshift from a sixth speed to a third speed, there has been proposed an apparatus that performs 6-4 shifting to downshift from the sixth speed to a fourth speed in the 6-3 shifting and activates, while carrying out the 6-4 shifting, engagement elements needed to be engaged in 4-3 shifting to downshift from the fourth speed to a third speed, and then performs the 4-3 shifting after the 6-4 shifting is completed (see, for example, Japanese Patent Application Publication No. JP-A-2002-195402).

SUMMARY OF THE INVENTION

Considering that a transmission is mounted in a vehicle, quickness in changing a shift speed can be considered as an important object to achieve traveling performance of the vehicle. Thus, there are demands for further improvement to allow application not only to a change of a shift speed in a limited situation, such as shifting during coast-down or 6-4 shifting, but also in a broad range.

It is a main object of a shift control apparatus and a transmission apparatus of the present invention to achieve quicker completion of a change of shift speed, so as to achieve higher traveling performance of a vehicle.

The shift control apparatus and the transmission apparatus of the present invention employ following means for achieving the above-described main object.

A shift control apparatus according to a first aspect of the present invention controlling a stepped transmission that is mounted in a vehicle and changes a shift speed by switching an engagement state of a friction engagement element by driving a hydraulic actuator includes: a gear ratio setting unit that sets a gear ratio to change gradually with respect to a change in a traveling state; a shift speed change determining unit that determines a change of shift speed by comparing the set gear ratio with a reference gear ratio corresponding to each shift speed; a shift speed change predicting unit that predicts in advance a change of shift speed by the shift speed change determining unit based on the set gear ratio, a rate of change in the set gear ratio, and an engagement preparation time which is a time needed for engagement preparation of the friction engagement element; and a shift control unit that controls the hydraulic actuator so that engagement preparation of a friction engagement element to be engaged is performed when a change of shift speed is predicted by the shift speed change predicting unit and performs standby, and controls the hydraulic actuator so that a hydraulic pressure needed for engaging the friction engagement element is supplied to a hydraulic servo of the friction engagement element when a change of shift speed is determined by the shift speed change determining unit.

In the shift control apparatus according to the first aspect of the present invention, a gear ratio is set to change gradually with respect to a change in a traveling state, a change of shift speed is determined by comparing the set gear ratio with a reference gear ratio corresponding to each shift speed. A change of shift speed is predicted in advance based on the set gear ratio, a rate of change in the set gear ratio, and an engagement preparation time which is a time needed for engagement preparation of the friction engagement element. The hydraulic actuator is controlled so that engagement preparation of a friction engagement element to be engaged is performed when a change of shift speed is predicted and a standby is performed. The hydraulic actuator is controlled so that a hydraulic pressure needed for engaging the friction engagement element is supplied to a hydraulic servo of the friction engagement element when a change of shift speed is determined. Accordingly, quicker completion of a change of shift speed is achieved, so as to achieve higher traveling performance of a vehicle. Here, the "traveling state" includes, for example, a vehicle speed, an accelerator operation amount, torque required for traveling, and a combination thereof. Further, according to a second aspect of the present invention, the gear ratio setting unit may be capable of setting the gear ratio as a gear ratio between a reference gear ratio of a predetermined shift speed and a reference gear ratio of a shift speed adjacent to the predetermined shift speed.

In the shift control apparatus of the present invention in the second aspect, according to a third aspect of the present invention, the shift speed change predicting unit may calculate an amount of change in a gear ratio during the engagement preparation time based on a rate of change in the set gear ratio and the engagement preparation time, calculate a predicted gear ratio which is a gear ratio predicted at a time when the engagement preparation time passes based on a sum of the amount of change in the calculated gear ratio and the set gear ratio, and predict a change of shift speed by comparing the calculated predicted gear ratio with an immediately close reference gear ratio in a direction of change in the set gear ratio. Accordingly, a change of shift speed can be predicted properly by simple processing. In the shift control apparatus of the present invention in the third aspect, according to a fourth aspect of the present invention, the shift speed change predicting unit may predict, when a shift speed is changed to an acceleration side, a change of shift speed when the predicted gear ratio becomes equal to or smaller than the immediately close gear ratio, and predict, when a shift speed is changed to a deceleration side, a change of shift speed when the predicted gear ratio becomes equal to or larger than the immediately close reference gear ratio.

Alternatively, in the shift control apparatus according to a fifth aspect of the present invention, the shift speed change predicting unit may calculate, based on the set gear ratio, a rate of change in the set gear ratio, and an immediately close reference gear ratio in a direction of a change in the set gear ratio, a predicted time to reach the reference gear ratio which is a predicted time to reach the immediately close reference gear ratio from the set gear ratio, and predict a change of shift speed by comparing the calculated predicted time to reach the reference gear ratio with the engagement preparation time. Accordingly, a change of shift speed can be predicted properly by simple processing. In the shift control apparatus of the present invention in the fifth aspect, according to a sixth aspect of the present invention, the shift speed change predicting unit may predict a change of shift speed when the predicted time to reach the reference gear ratio becomes equal to or shorter than the engagement preparation time.

In the shift control apparatus according to a seventh aspect of the present invention in any one of the above-described aspects, controlling a stepped transmission that includes a plurality of friction engagement elements and is capable of changing a shift speed by changing a combination of engagement and non-engagement of the plurality of friction engagement elements, the engagement preparation time may be defined to be a different time for each friction engagement element, and the shift speed change predicting unit may predict in advance a change of shift speed by the shift speed change determining unit based on the set gear ratio, a rate of change in the set gear ratio, and the engagement preparation time of an immediately close shift speed in a direction of a change in the set gear ratio. Accordingly, even when the engagement preparation time differs for each friction engagement element to be engaged, a change of shift speed can be determined in the vicinity of a timing of completion of the engagement preparation time, regardless of the friction engagement element to be engaged.

A transmission apparatus according to an eighth aspect of the present invention includes: an automatic transmission; and the shift control apparatus of the present invention in any one of the above-described aspects.

Since the transmission apparatus of the present invention includes the shift control apparatus of the present invention in any one of the above-described aspects, the transmission apparatus is capable of achieving effects which are achieved by the shift control apparatus of the present invention. Such effects include, for example, achievement of higher traveling performance of a vehicle by completing a change of shift speed more quickly, appropriate prediction of a change of shift speed by simple processing, and determination of a change of shift speed in the vicinity of a timing of completion of the engagement preparation time, regardless of the friction engagement element to be engaged, even when the engagement preparation time differs for each friction engagement element to be engaged.

BRIEF DESCRIPTION OF THE DRAWINGS

FIG. 2 is an explanatory diagram illustrating an operation table of an automatic transmission 20;

FIG. 5 is an explanatory chart illustrating how a target input shaft rotation speed Nin*, a target gear ratio change rate Vgr, and a hydraulic instruction to a clutch C3 change over time during 2-3 shifting in the embodiment;

FIG. 11 is an explanatory chart illustrating how the target input shaft rotation speed Nin*, the target gear ratio change rate Vgr, and respective hydraulic instructions to the clutches C1, C3 and the brake B1 change over time during 6-5 shifting after 6-4 shifting is canceled in the embodiment;

FIG. 13 is a flowchart illustrating an example of the pre-servo activation control routine of a modification example.

DETAILED DESCRIPTION OF THE EMBODIMENTS

Next, an embodiment of the present invention will be described using examples.

Figure 1:
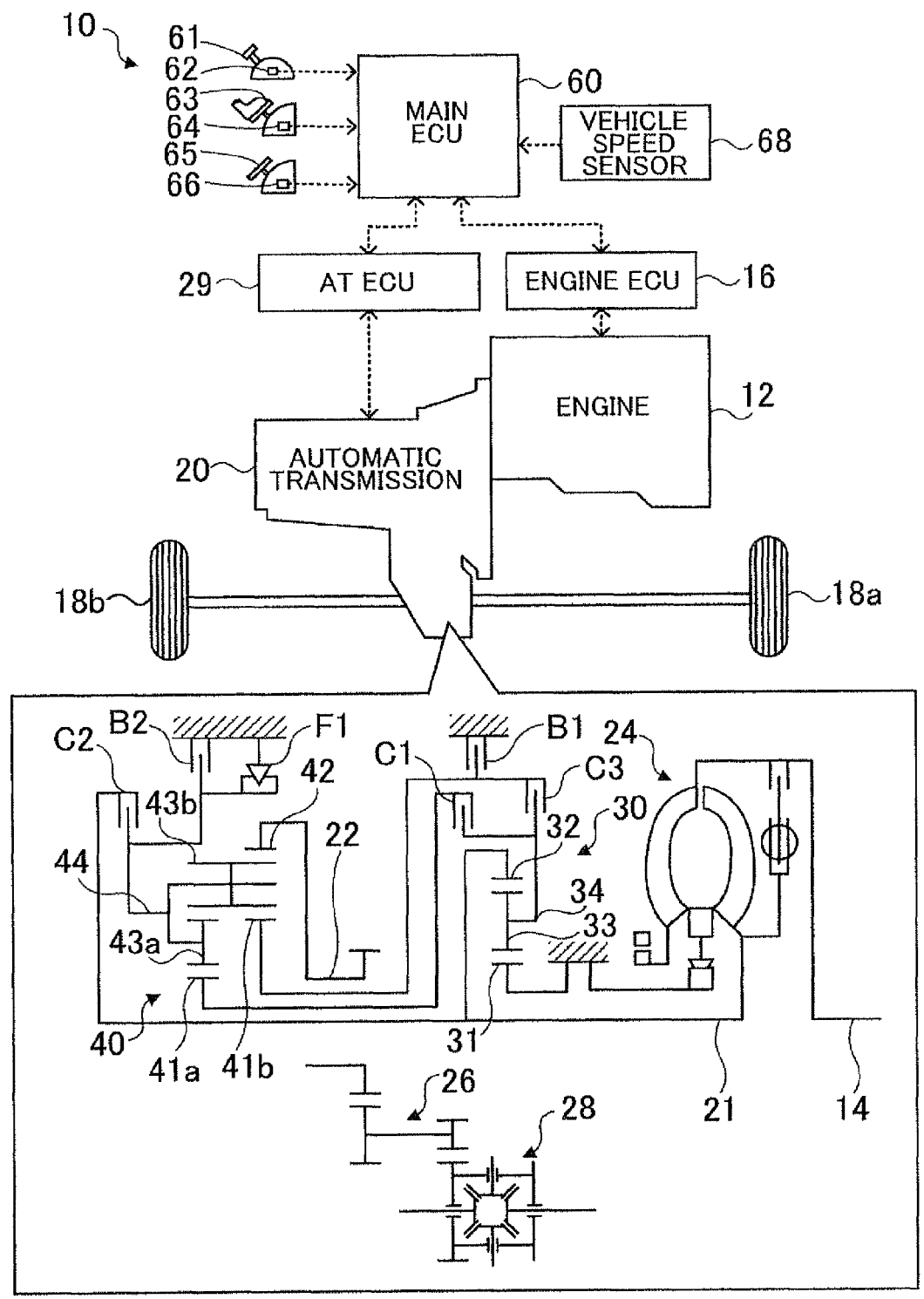
FIG. 1 is a structural diagram illustrating an overview of the structure of an automobile 10 in which a transmission apparatus as one embodiment of the present invention is mounted.
Figure 3:
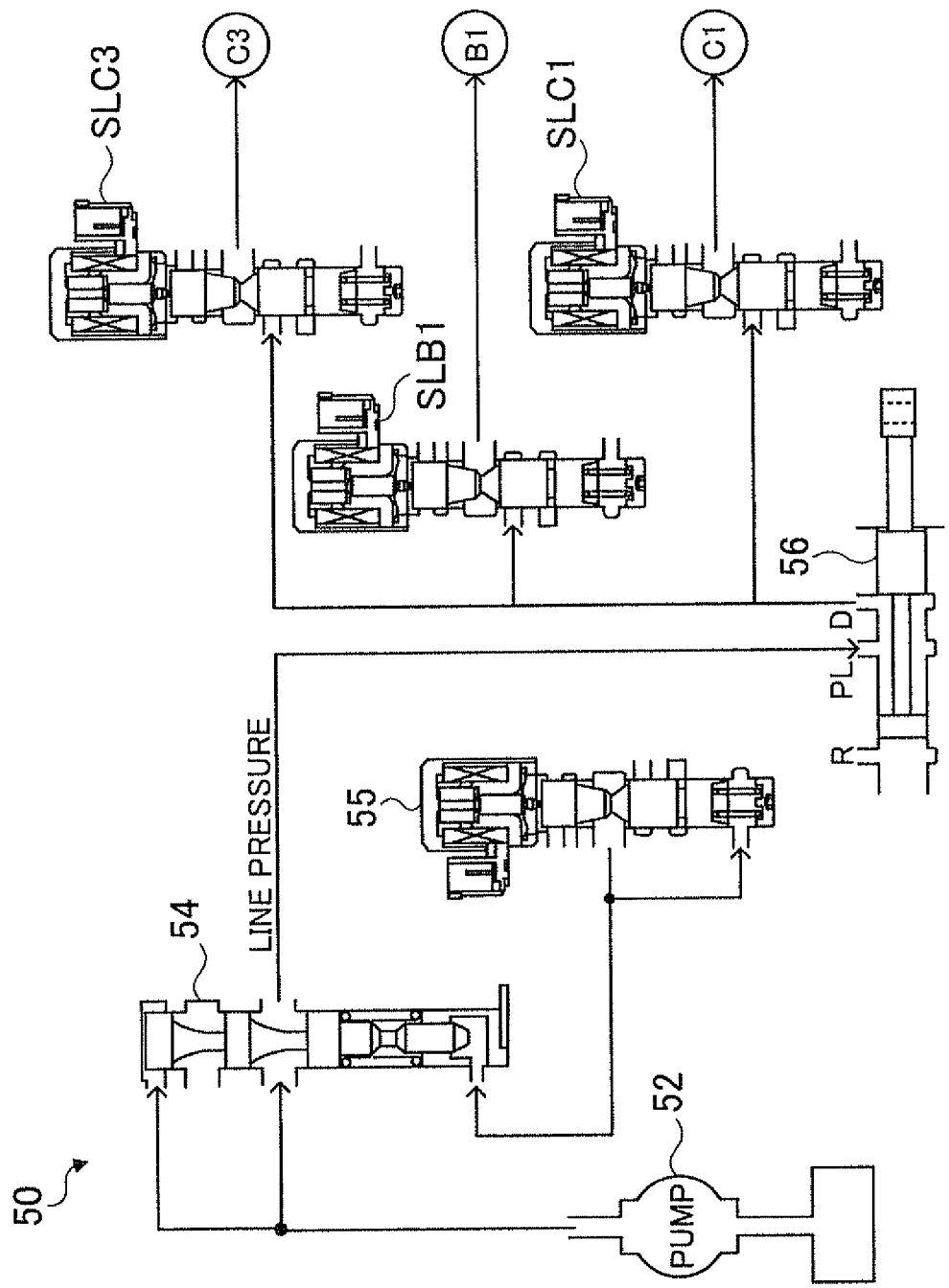
FIG. 3 is a structural diagram illustrating an overview of the structure of a hydraulic circuit 50.

FIG. 1 is a structural diagram illustrating an overview of the structure of an automobile 10 in which a power output apparatus incorporating a transmission apparatus as one embodiment of the present invention is mounted. FIG. 2 illustrates an operation table of an automatic transmission 20. FIG. 3 is a structural diagram illustrating an overview of the structure of a hydraulic circuit 50 of the automatic transmission 20. As illustrated in FIG. 1, the automobile 10 of the embodiment includes an engine 12 as an internal combustion engine outputting power by explosive combustion of hydrocarbon fuel such as gasoline or diesel oil, a torque converter 24 with a lock-up clutch attached to a crank shaft 14 of the engine 12, the automatic transmission 20 as a stepped automatic transmission having an input shaft 21 connected to an output side of the torque converter 24 and an output shaft 22 connected to driving wheels 18a, 18b via a gear mechanism 26 and a differential gear 28, and shifting the power inputted to the input shaft 21 and transmitting the shifted power to the output shaft 22, and a main electronic control unit (hereinafter referred to as a main ECU) 60 controlling the entire power output apparatus. The torque converter 24 is interposed between the engine 12 and the automatic transmission 20 in the embodiment. However, the present invention is not limited to this embodiment, and various starting devices may be employed.

The operation of the engine 12 is controlled by an engine electronic control unit (hereinafter referred to as an engine ECU) 16. Although not illustrated in detail, the engine ECU 16 is structured as a microprocessor with a CPU as a main component, and has a ROM storing processing programs, a RAM temporarily storing data, an input/output port, and a communication port, besides the CPU. Signals from various sensors needed for controlling the operation of the engine 12, such as an engine speed sensor attached to the crank shaft 14, are inputted to the engine ECU 16 via an input port, and a drive signal to a throttle motor adjusting a throttle opening, a control signal to a fuel injection valve, an ignition signal to spark plugs, and so on are outputted from the engine ECU 16 via an output port. The engine ECU 16 communicates with the main ECU 60, controls the engine 12 by a control signal from the main ECU 60, and outputs data related to the operating state of the engine 12 to the main ECU 60 as necessary.

The automatic transmission 20 is structured as a six-speed stepped transmission, and has a single pinion type planetary gear mechanism 30, a Ravigneaux type planetary gear mechanism 40, three clutches C1, C2, C3, two brakes B1, B2, and a one-way clutch F1. The single pinion type planetary gear mechanism 30 has a sun gear 31 as an external gear, a ring gear 32 as an internal gear arranged concentrically with the sun gear 31, a plurality of pinion gears 33 meshing with the sun gear 31 and with the ring gear 32, and a carrier 34 rotatably and revolvably holding the plurality of pinion gears 33. The sun gear 31 is fixed to a case, and the ring gear 32 is connected to the input shaft 21. The Ravigneaux type planetary gear mechanism 40 has two sun gears 41a, 41b as external gears, a ring gear 42 as an internal gear, a plurality of short pinion gears 43a meshing with the sun gear 41a, a plurality of long pinion gears 43b meshing with the sun gear 41b and the plurality of short pinion gears 43a and with the ring gear 42, and a carrier 44 coupling the plurality of short pinion gears 43a and the plurality of long pinion gears 43b and holding these pinion gears rotatably and revolvably. The sun gear 41a is connected to the carrier 34 of the single pinion type planetary gear mechanism 30 via the clutch C1. The sun gear 41b is connected to the carrier 34 via the clutch C3 and to the case via the brake B1. The ring gear 42 is connected to the output shaft 22. The carrier 44 is connected to the input shaft 21 via the clutch C2. The carrier 44 is connected to the case via the brake B2, and to the case via the one-way clutch F1.

In the automatic transmission 20 structured thus, it is possible to switch among first to sixth forward speeds, a reverse speed, and a neutral, by combinations of turning on (engagement) and off (disengagement) of the clutches C1 to C3 and turning on and off of the brakes B1, B2, as illustrated in FIG. 2. A state of neutral can be formed by turning off the clutches C1 to C3 and the brakes B1, B2. A state of the first forward speed can be formed by turning on the clutch C1 and turning off the clutches C2, C3 and the brakes 81, B2. A state of the second forward speed can be formed by turning on the clutch C1 and the brake B1 and turning off the clutches C2, C3 and the brake B2. A state of the third forward speed can be formed by turning on the clutches C1, C3 and turning off the clutch C2 and the brakes B1, B2. A state of the fourth forward speed can be formed by turning on the clutches C1, C2 and turning off the clutch C3 and the brakes B1, B2. A state of the fifth forward speed can be formed by turning on the clutches C2, C3 and turning off the clutch C1 and the brakes B1, B2. A state of the sixth forward speed can be formed by turning on the clutch C2 and the brake B1, and turning off the clutches C1, C3 and the brake B2. A state of a first reverse speed can be formed by turning on the clutch C3 and the brake B2 and turning off the clutches C1, C2 and the brake B1.

The clutches C1 to C3 and the brakes B1, B2 of the automatic transmission 20 are turned on and off by the hydraulic circuit 50 partially illustrated in FIG. 3. As illustrated, the hydraulic circuit 50 is structured from: a mechanical oil pump 52 pressure feeding operating oil by a power from the engine 12; a regulator valve 54 adjusting a pressure (line pressure PL) of the operating oil pressure fed by the oil pump 52; a linear solenoid 55 driving this regulator valve 54; a linear solenoid SLC1 to which the line pressure PL is inputted via a manual valve 56 and which adjusts and outputs the line pressure PL to the clutch C1 side; a linear solenoid SLC3 to which the line pressure PL is inputted likewise via the manual valve 56 and which adjusts and outputs the line pressure PL to the clutch C3 side; a linear solenoid SLB1 to which the line pressure PL is inputted likewise via the manual valve 56 and which adjusts and outputs the line pressure PL to the brake B1 side; and so on. Although only hydraulic systems of the clutches C1, C3 and the brake B1 are illustrated in FIG. 3, the other clutch C2 and brake B2 can be formed of a similar hydraulic system.

The automatic transmission 20 (the hydraulic circuit 50) is drive-controlled by an automatic transmission electronic control unit (hereinafter referred to as an ATECU) 29. The ATECU 29 is structured as, although not illustrated in detail, a microprocessor with a CPU as a main component, and has a ROM storing processing programs, a RAM temporarily storing data, an input/output port, and a communication port, besides the CPU. To the ATECU 29, an input shaft rotation speed Nin from a rotation speed sensor (not shown) attached to the input shaft 21, an output shaft rotation speed Nout from a rotation speed sensor (not shown) attached to the output shaft 22, an oil temperature from an oil temperature sensor (not shown) attached to the hydraulic circuit 50, and so on are inputted via an input port. From the ATECU 29, drive signals to the linear solenoid 55, the linear solenoid SLC1, the linear solenoid SLB1, and so on are outputted via an output port. The ATECU 29 communicates with the main ECU 60, controls the automatic transmission 20 (hydraulic circuit 50) by a control signal from the main ECU 60, and outputs data related to the state of the automatic transmission 20 to the main ECU 60 as necessary.

The main ECU 60 is structured as, although not illustrated in detail, a microprocessor with a CPU as a main component, and has a ROM storing processing programs, a RAM temporarily storing data, an input/output port, and a communication port, besides the CPU. To the main ECU 60, a shift position SP from a shift position sensor 62 detecting an operation position of the shift lever 61, an accelerator operation amount Acc from an accelerator pedal position sensor 64 detecting a depression amount of an accelerator pedal 63, a brake switch signal BSW from a brake switch 66 detecting depression on a brake pedal 65, a vehicle speed V from a vehicle speed sensor 68, and so on are inputted via an input port. As described above, the main ECU 60 is connected to the engine ECU 16 and the ATECU 29 via the communication port, and exchanges various control signals and data with the engine ECU 16 and the ATECU 29.

Here, the automatic transmission 20 and the ATECU 29 correspond to the transmission apparatus of the embodiment.

Figure 4:
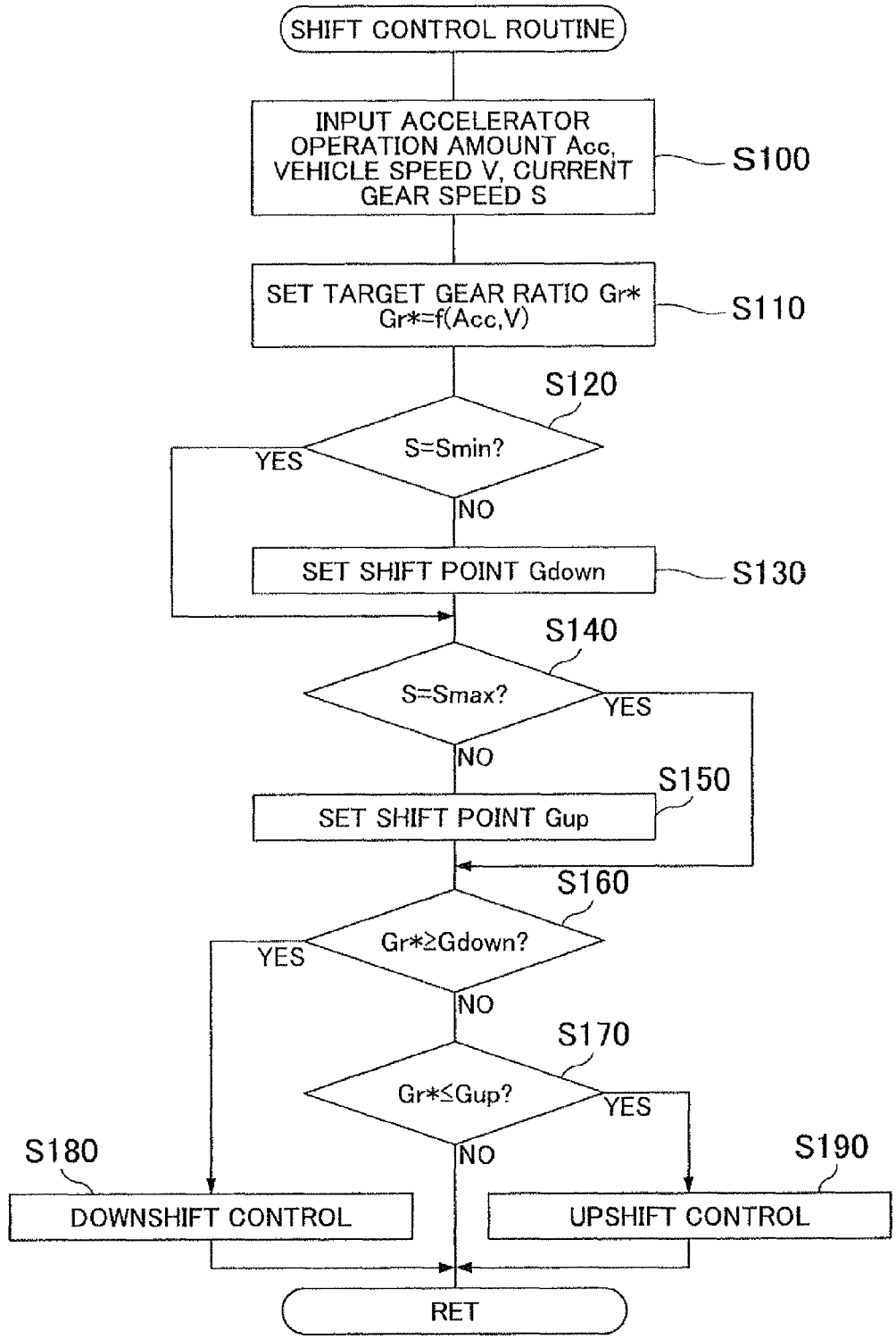
FIG. 4 is a flowchart illustrating an example of a shift control routine executed by an ATECU 29 of the embodiment.

Next, operation of the thus structured transmission apparatus of the embodiment, particularly, operation when a gear speed is changed (shifted) accompanying pre-servo activation will be described. For convenience of description, first a shift control routine will be described, and thereafter pre-servo activation control will be described. The pre-servo activation control is to carry out a fast fill, which rapidly charges operating oil to a hydraulic servo of a clutch (brake) to be turned on in next shifting out of the clutches C1 to C3 and the brakes B1, B2 to the vicinity of a stroke end pressure, and thereafter perform low-pressure standby. Therefore, in the shift control, there is performed shift control after pre-servo activation, that is, control to gradually increase the hydraulic pressure to act on a hydraulic servo of a clutch (brake) to be turned on (sweep apply processing). In the pre-servo activation control, when there is a clutch (brake) to be turned off in the next shifting, drain control to drain the hydraulic pressure supplied to the hydraulic servo of this clutch (brake) is performed concurrently. FIG. 4 is a flowchart illustrating an example of a shift control routine executed by the ATECU 29. This routine is executed repeatedly at every predetermined time (for example, every few milliseconds).

When the shift control routine is executed, the CPU of the ATECU 29 first performs processing by which necessary data for control such as the accelerator operation amount Acc, the vehicle speed V, the current gear speed S, and so on are inputted (step S100). Here, the accelerator operation amount Acc and the vehicle speed V, which are detected by the accelerator pedal position sensor 64 and the vehicle speed sensor 68, respectively, are inputted from the main ECU 60 via communication. When the gear speed after shifting is stored in this routine, this stored gear speed can be inputted as the current gear speed S.

Figure 5:
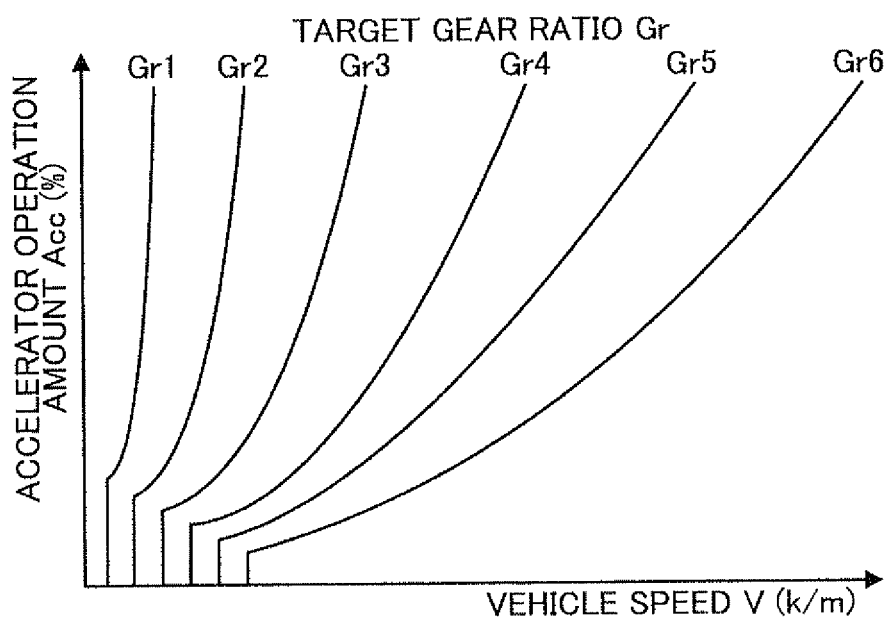
FIG. 5 is an explanatory diagram illustrating an example of a shift map.
Figure 6:
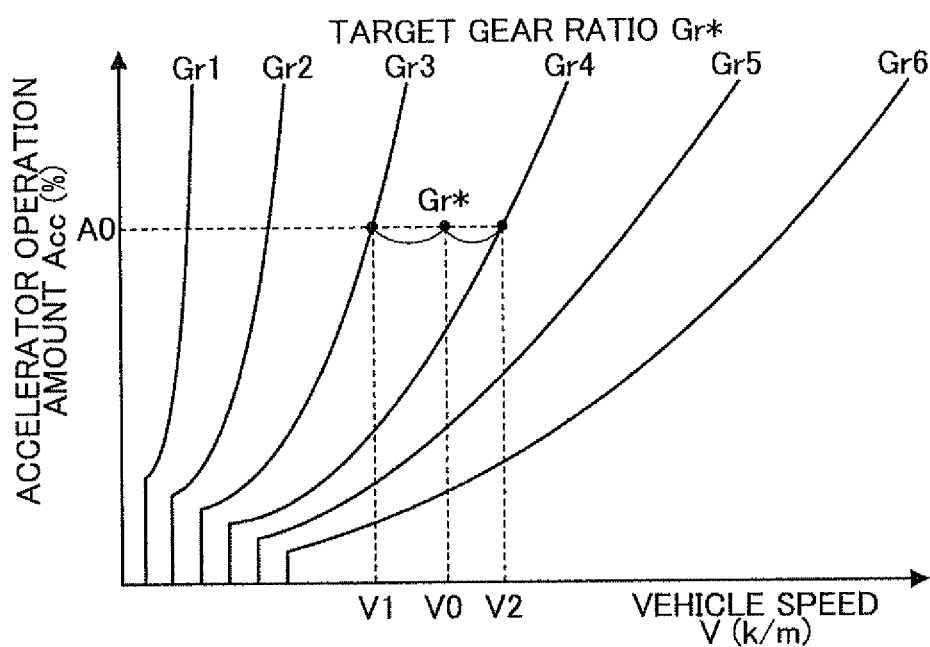
FIG. 6 is an explanatory diagram illustrating how a target gear ratio Gr* is set using the shift map.

When necessary data for control are inputted in this manner, a target gear ratio Gr* is set based on the accelerator operation amount Acc, the vehicle speed V, and the current gear speed S which are inputted (step S110). Here, the target gear ratio Gr* is, for example, an ideal gear ratio for the engine 12 to efficiently output power required for traveling based on the current accelerator operation amount Acc and the vehicle speed V, and is set to change linearly with respect to changes in the accelerator operation amount Acc and the vehicle speed V. Therefore, the target gear ratio Gr* includes, beside respective gear ratios Gr1 to Gr6 corresponding to the respective gear speeds of the first forward speed to the sixth forward speed which can be formed in the automatic transmission 20 as a stepped transmission, gear ratios which cannot be formed in the automatic transmission 20, that is, intermediate gear ratios among the respective gear ratios Gr1 to Gr6. As illustrated in FIG. 5 and FIG. 6 for example, specific setting of the target gear ratio Gr* can be derived by interpolating (linearly interpolating) the gear ratio (shift point) of each gear speed in a shift map at the current accelerator operation amount Acc, based on vehicle speeds V1, V2 at previous and subsequent shift points and the current vehicle speed V. It is possible of course to obtain the relation of the accelerator operation amount Acc and the vehicle speed V with the target gear ratio Gr* for efficiently operating the engine 12 in advance, stores the relation as a map, and derive the target gear ratio Gr* directly from the map when the accelerator operation amount Acc and the vehicle speed V are given.

Next, it is determined whether the current gear speed S is the lowest gear speed (the first forward speed in the embodiment) or not (step S120), and when it is not the lowest gear speed, the gear ratio corresponding to the gear speed on a downshift side from the current gear speed S is set as a shift point Gdown on the downshift side (step S130). Then, it is determined whether the current gear speed S is the highest gear speed (the sixth speed in the embodiment) or not (step S140), and when it is not the highest gear speed, the gear ratio corresponding to the gear speed on an upshift side from the current gear speed is set as a shift point Gup on the upshift side (step S150).

It is determined whether or not the target gear ratio Gr* is equal to or larger than the shift point Gdown on the downshift side (step S160), and it is determined whether or not the target gear ratio Gr* is equal to or smaller than the shift point Gup on the upshift side (step S170). When the target gear ratio Gr* is equal to or larger than the shift point Gdown on the downshift side, downshift control to downshift to the gear speed corresponding to the shift point Gdown is performed (step S180). When the target gear ratio Gr* is equal to or smaller than the shift point Gup on the upshift side, upshift control to upshift to the gear speed corresponding to the shift point Gup is performed (step S190). When the target gear ratio Gr* is smaller than the shift point Gdown and larger than the shift point Gup, the current gear speed is maintained and this routine is finished. In short, when the target gear ratio Gr* is decreasing, upshift is performed at the time when the target gear ratio Gr* becomes equal to or smaller than the shift point Gup, which is the gear ratio corresponding to each gear speed on the upshift side from the current gear speed S. When the target gear ratio Gr* is increasing, downshift is performed at the time when the target gear ratio Gr* becomes equal to or larger than the shift point Gdown, which is the gear ratio corresponding to each gear speed on the downshift side from the current gear speed S. Thus, the shift control routine has been described.

Figure 7:
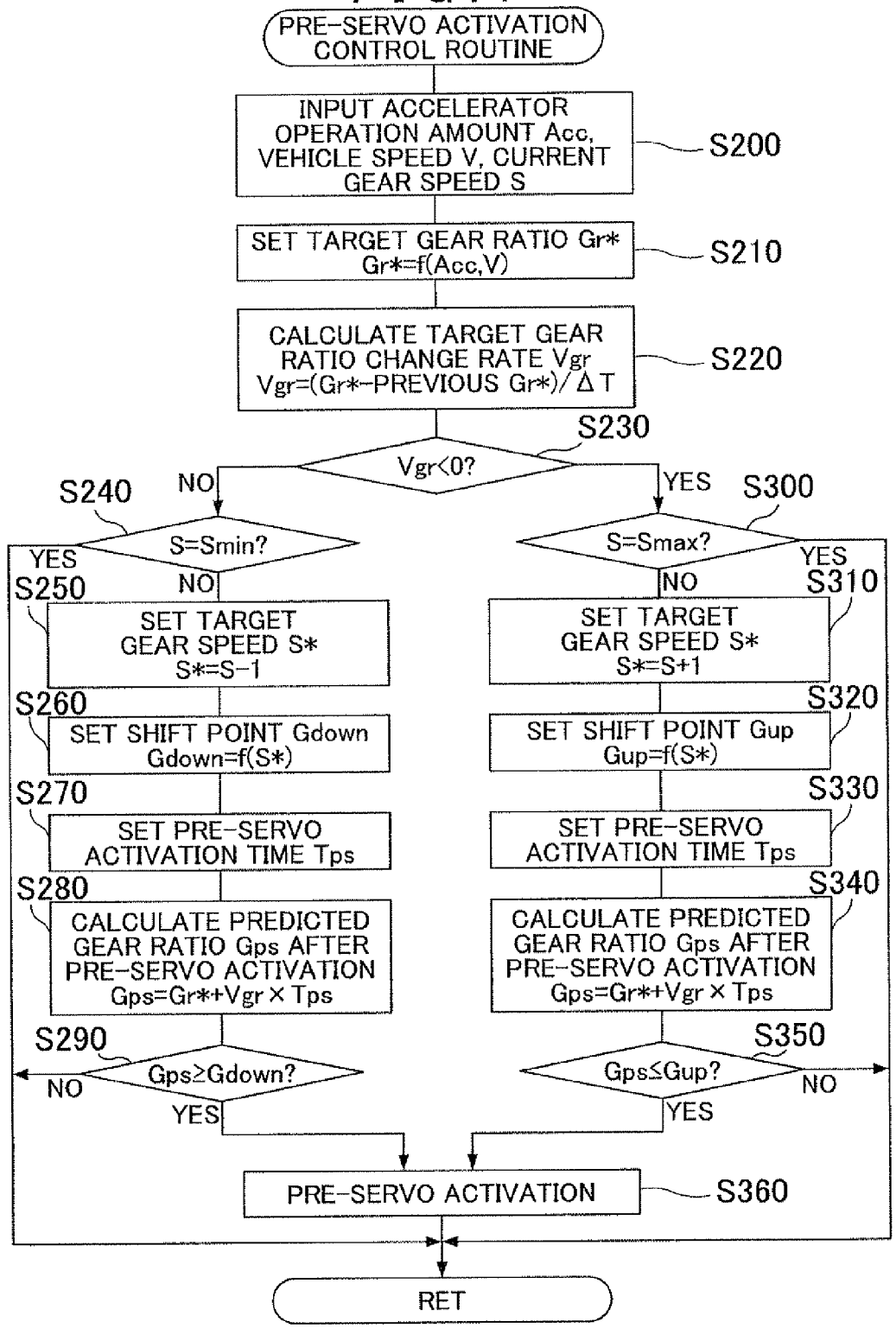
FIG. 7 is a flowchart illustrating an example of a pre-servo activation control routine executed by the ATECU 29 of the embodiment.

Next, the pre-servo activation control routine will be described. FIG. 7 is a flowchart illustrating an example of the pre-servo activation control routine executed by the ATECU 29. This routine is executed repeatedly at every predetermined time (for example, every few milliseconds).

When the pre-servo activation control routine is executed, the CPU of the ATECU 29 first performs input of the accelerator operation amount Acc, the vehicle speed V, and the current gear speed S (step S200), sets the target gear ratio Gr* based on the inputted accelerator operation amount Acc and vehicle speed V (step S210), and sets a target gear ratio change rate Vgr, which is a rate of change in the set target gear ratio Gr* (step S220). Here, specifically, the target gear ratio change rate Vgr can be calculated by dividing a deviation between the target gear ratio Gr* that is set this time and the target gear ratio that is set previously (previous Gr*) by an execution time interval $\Delta T$ of this routine. Inputting of the accelerator operation amount Acc, the vehicle speed V, and the current gear speed S and setting of the target gear ratio Gr* are already described.

Once the target gear ratio change rate Vgr is calculated, it is determined whether the calculated target gear ratio change rate Vgr is positive or negative (step S230). When the target gear ratio change rate Vgr is positive, it is determined that there is a possibility of shifting on the downshift side, and it is determined whether the current gear speed S is the lowest gear speed (first speed) or not (step S240). When the current gear speed S is not the lowest gear speed, a target gear speed S* is set to the gear speed that is one speed lower than the current gear speed S (step S250), and the gear ratio corresponding to the set target gear speed S* is set as the shift point Gdown (step S260). Then a time needed for pre-servo activation (pre-servo activation time Tps) when downshift is performed from the current gear speed S to the target gear speed S* is set (step S270). A predicted gear ratio Gps after pre-servo activation, which is a predicted value of the target gear ratio when the pre-servo activation time Tps passes from the current target gear ratio Gr*, is calculated with the following formula (1) (step S280) based on the target gear ratio Gr*, the target gear ratio change rate Vgr, and the pre-servo activation time Tps, and the calculated predicted gear ratio Gps after pre-servo activation is compared with the shift point Gdown (step S290). When the predicted gear ratio Gps after pre-servo activation is equal to or larger than the shift point Gdown, the pre-servo activation is performed (step S360), and this routine is finished. Here, setting of the pre-servo activation time Tps can be performed by, for example, obtaining the relation among an oil temperature, the input shaft rotation speed Nin, and the pre-servo activation time Tps in advance and stores this relation as a map in a ROM, and deriving the corresponding pre-servo activation time Tps from the map when the oil temperature and the input shaft rotation speed Nin are given. This pre-servo activation time Tps is set for every target gear speed S* and in every direction of shifting (upshift side and downshift side) because the necessary time differs among the clutches C1 to C3 and between the brakes B1, B2 in this embodiment. In this manner, the pre-servo activation time Tps is set in advance, and the pre-servo activation is performed at a timing earlier by the pre-servo activation time Tps than the time when the target gear ratio Gr* reaches the shift point Gdown. Thus, the pre-servo activation can be completed by the time when shifting is determined in the shift control routine in FIG. 4, and the shift control can be completed quickly.

$$Gps=Gr^*+Vgr \times Tps \qquad (1)$$

When the target gear ratio change rate Vgr is negative, it is determined that there is a possibility of shifting on the upshift side, and it is determined whether the current gear speed S is the highest gear speed (sixth speed) or not (step S300). When the current gear speed S is not the highest gear speed, the target gear speed S* is set to the gear speed that is one step higher than the current gear speed S (step S310), and the gear ratio corresponding to the set target gear speed S* is set as the shift point Gup (step S320). Then a time needed for pre-servo activation (pre-servo activation time Tps) when upshift is performed from the current gear speed S to the target gear speed S* is set (step S330). A predicted gear ratio Gps after pre-servo activation, which is a predicted value of the target gear ratio when the pre-servo activation time Tps passes from the current target gear ratio Gr*, is calculated with the above-described formula (1) based on the target gear ratio Gr* (step S340), the target gear ratio change rate Vgr, and the pre-servo activation time Tps, and the calculated predicted gear ratio Gps after pre-servo activation is compared with the shift point Gup (step S350). When the predicted gear ratio Gps after pre-servo activation is equal to or smaller than the shift point Gup, the pre-servo activation is performed (step S360), and this routine is finished. The pre-servo activation time Tps is set for every target gear speed S* and in every direction of shifting (upshift side or downshift side) based on the oil temperature and the input shaft rotation speed Nin, as described above.

Figure 8:
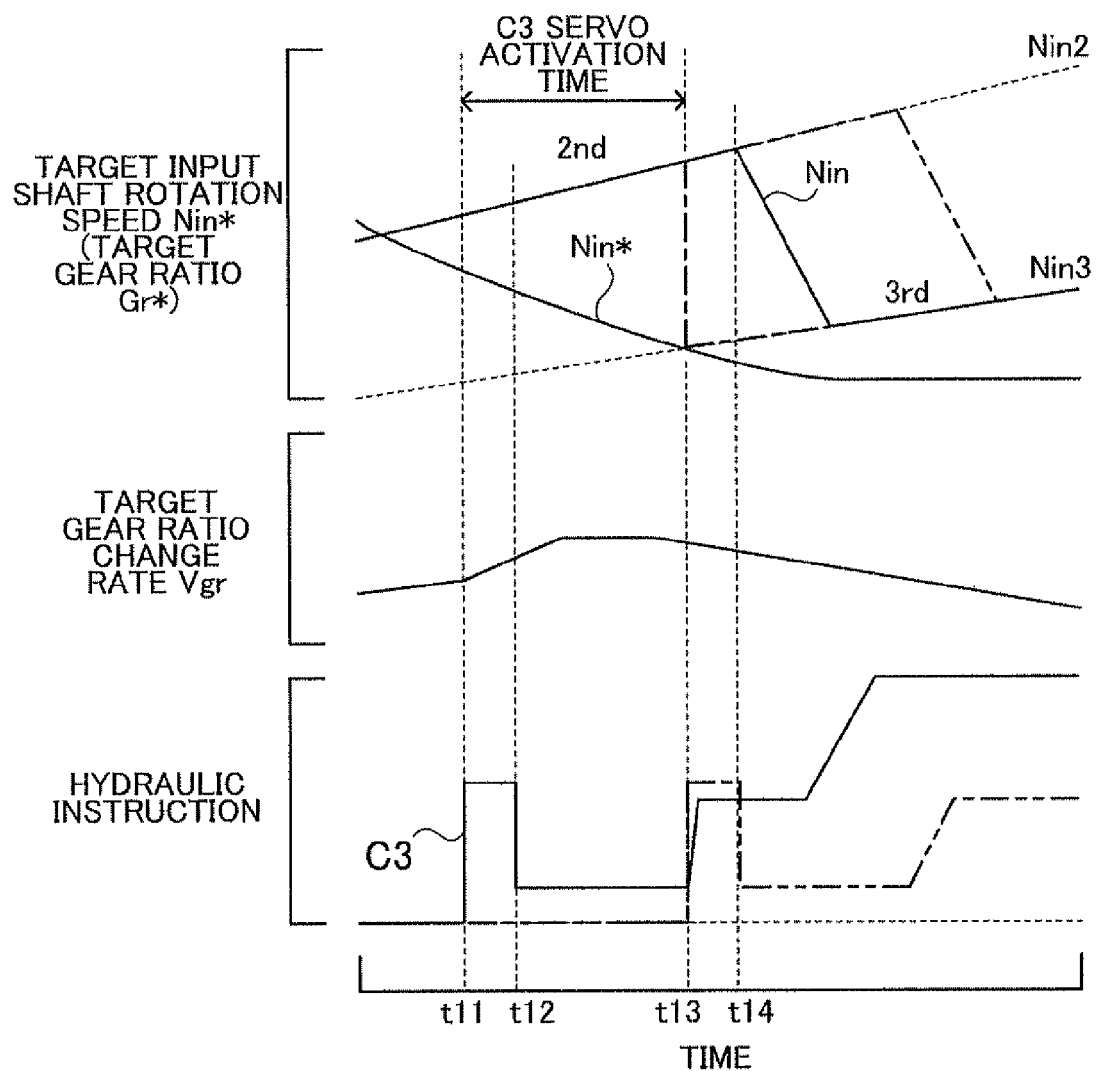

FIG. 8 is an explanatory chart illustrating how a target input shaft rotation speed Nin*, the target gear ratio change rate Vgr, and a hydraulic instruction to the clutch C3 change over time during 2-3 shifting in the embodiment. Broken lines in the chart illustrate a comparative example. In the comparative example, it is assumed that the pre-servo activation is started at a timing when downshift is determined in step S160 or when upshift is determined in step S170 in the shift control routine of FIG. 4. The target input shaft rotation speed Nin* illustrated in the chart is obtained by substituting the rotation speed of the input shaft 21 for the target gear ratio Gr*. As illustrated, in the embodiment, time t11 earlier by a time needed for pre-servo activation of the clutch C3 for 2-3 shifting (C3 pre-servo activation time) than time t13 when the current target gear ratio Gr* reaches the shift point Gup of 2-3 shifting is estimated from the target gear ratio change rate Vgr and the C3 pre-servo activation time so as to start the fast fill, and then low-pressure standby is performed (the pre-servo activation is performed) at time t12 when the fast fill is completed. Thus, when the target gear ratio Gr* reaches the shift point Gup at time t13, the hydraulic pressure supplied to the hydraulic servo of the clutch C3 is increased immediately to engage the clutch C3 by sweep apply control. On the other hand, in the comparative example, the pre-servo activation is started at time t13, and thus it can be understood that the completion of shifting is delayed by the amount of the C3 pre-servo activation time compared to the embodiment.

Figure 9:
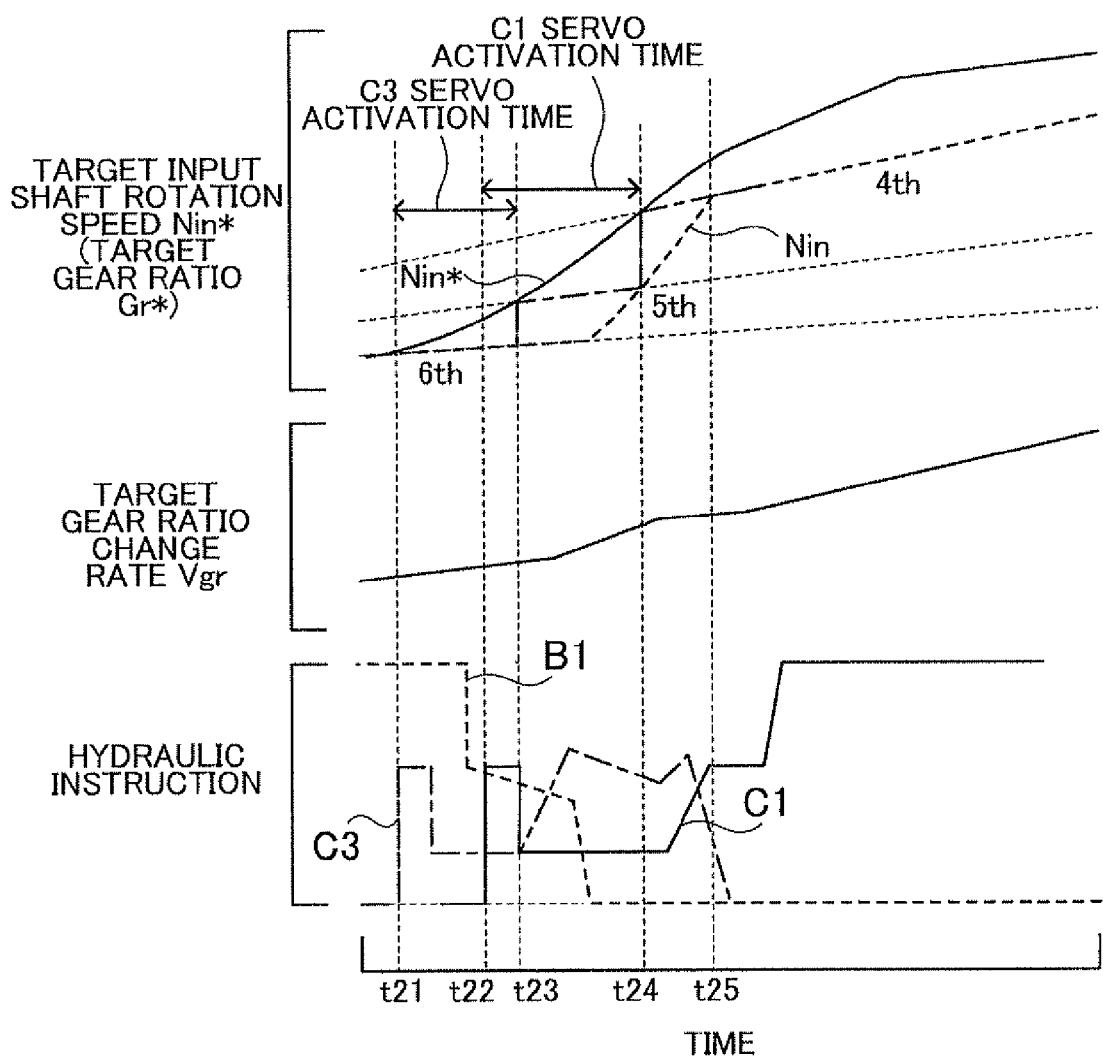
FIG. 9 is an explanatory chart illustrating how the target input shaft rotation speed Nin*, the target gear ratio change rate Vgr, and respective hydraulic instructions to the clutches C1, C3 and a brake B1 change over time during 6-4 shifting in the embodiment.
Figure 10:
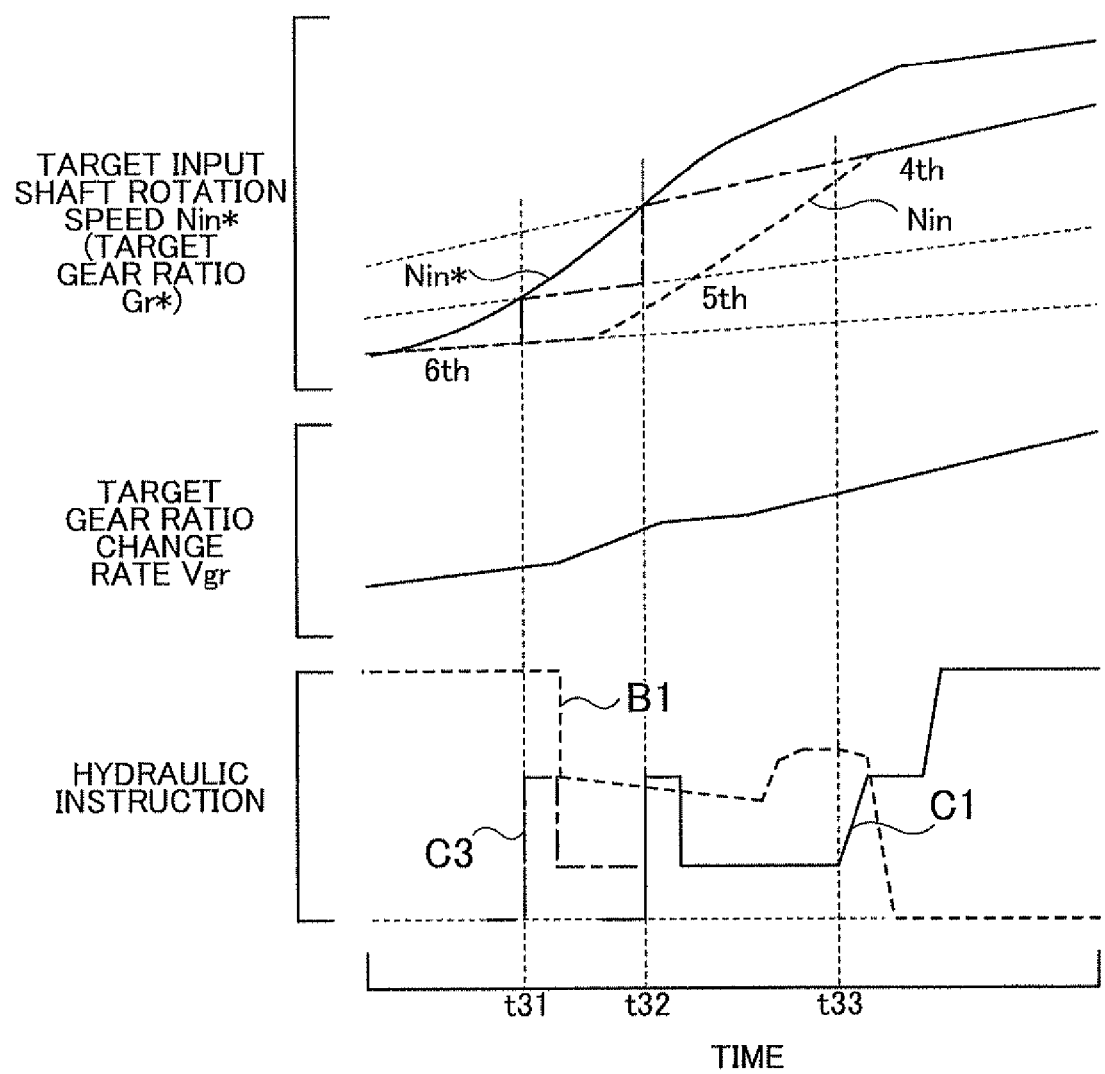
FIG. 10 is an explanatory chart illustrating how the target input shaft rotation speed Nin*, the target gear ratio change rate Vgr, and respective hydraulic instructions to the clutches C1, C3 and the brake B1 change over time during 6-4 shifting in a comparative example.

FIG. 9 is an explanatory chart illustrating how the target input shaft rotation speed Nin*, the target gear ratio change rate Vgr, and respective hydraulic instructions to the clutches C1, C3 and the brake B1 change over time during 6-4 shifting in the embodiment, and FIG. 10 illustrates a comparative example thereof. In the comparative example, it is assumed that the pre-servo activation is started at a timing when downshift is determined in step S160 or when upshift is determined in step S170 in the shift control routine of FIG. 4. In the embodiment, as illustrated in FIG. 9, time t21 earlier by a time needed for pre-servo activation of the clutch C3 for 6-5 shifting (C3 pre-servo activation time) than time t23 when the current target gear ratio Gr* (target input shaft rotation speed Nin*) reaches the shift point Gdown of 6-5 shifting is estimated from the target gear ratio change rate Vgr and the C3 pre-servo activation time so as to start pre-servo activation of the clutch C3. At this time, processing to drain the hydraulic pressure acting on the hydraulic servo of the brake B1 to be turned off in 6-5 shifting is also started. When time t22 comes, which is earlier by a time needed for pre-servo activation of the clutch C1 for 5-4 shifting (C1 pre-servo activation time) than time t24 when the target gear ratio Gr* reaches the shift point Gdown of 5-4 shifting, pre-servo activation of the clutch C1 is started. Then sweep apply control of the clutch C3 is started at time t23 when the target gear ratio Gr* reaches the shift point Gdown of the 6-5 shifting. When the target gear ratio Gr* reaches the shift point Gdown of 5-4 shifting (time t24), sweep apply control of the clutch C1 is started and the sweep apply control of the clutch C3 is canceled, thereby completing the 6-4 shifting. On the other hand, in the comparative example, as illustrated in FIG. 10, pre-servo activation of the clutch C3 is started at time t31 (corresponding to t23 in FIG. 9) when the current target gear ratio Gr* reaches the shift point Gdown of the 6-5 shifting. Pre-servo activation of the clutch C1 is started at time t32 (corresponding to time t24 in FIG. 9) when the target gear ratio Gr* reaches the shift point Gdown of 5-4 shifting, and the pre-servo activation of the clutch C3 is canceled. Sweep apply control of the clutch C1 is started at time t33 when the pre-servo activation of the clutch C1 is completed, thereby completing the 6-4 shifting. Accordingly, also in the 6-4 shifting, it can be understood that the completion of shifting is delayed by the amount of the C1 pre-servo activation time compared to the embodiment.

Figure 12:
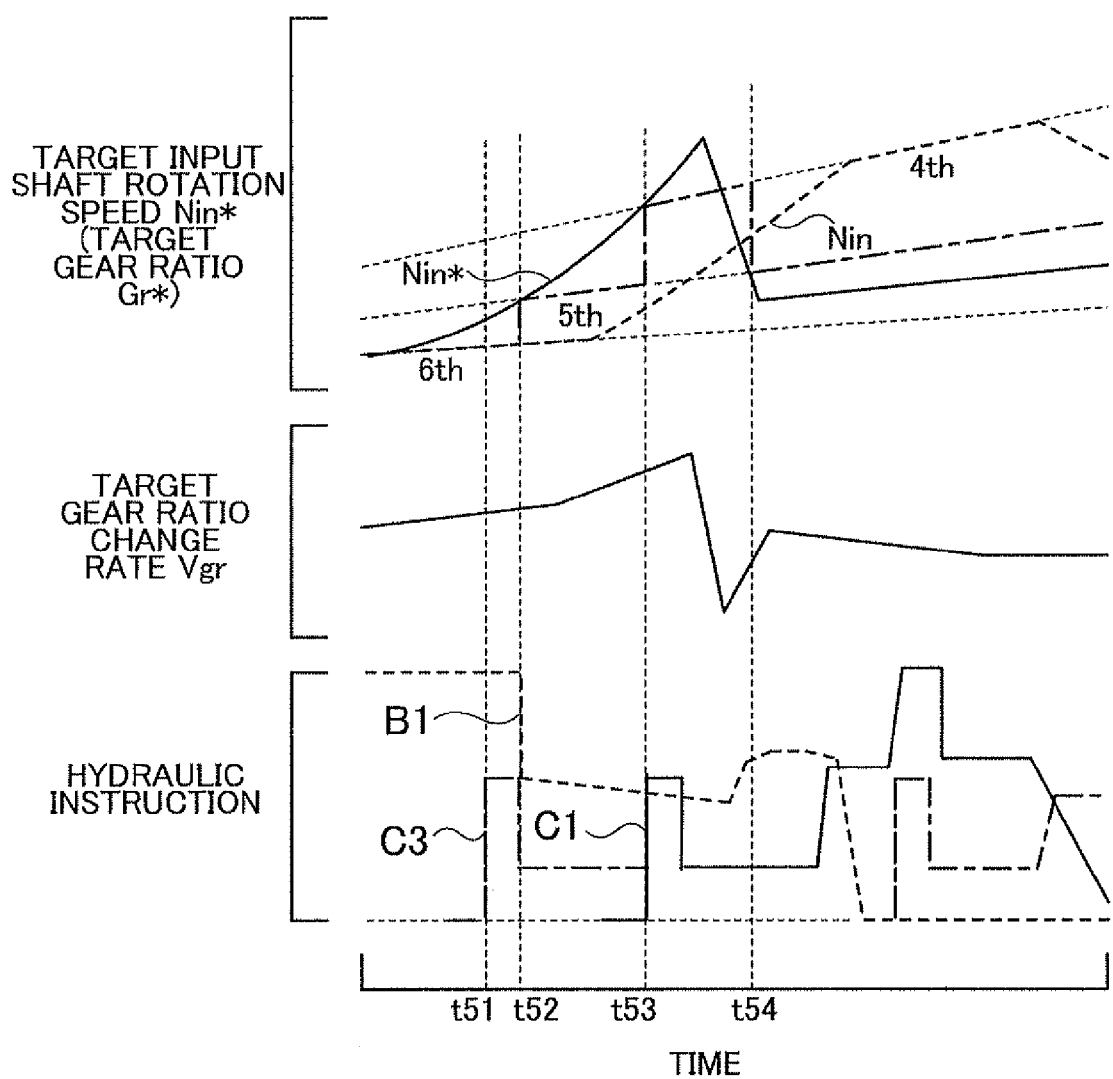
FIG. 12 is an explanatory chart illustrating how the target input shaft rotation speed Nin*, the target gear ratio change rate Vgr, and respective hydraulic instructions to the clutches C1, C3 and the brake B1 change over time during 6-5 shifting after 6-4 shifting is canceled in a comparative example.

FIG. 11 is an explanatory chart illustrating how the target input shaft rotation speed Nin*, the target gear ratio change rate Vgr, and respective hydraulic instructions to the clutches C1, C3 and the brake B1 change over time during 6-5 shifting after 6-4 shifting is canceled in the embodiment, and FIG. 12 illustrates a comparative example thereof. In the comparative example, it is assumed that the pre-servo activation is started at a timing when downshift is determined in step S160 or when upshift is determined in step S170 in the shift control routine of FIG. 4. Here, pre-servo activation of the clutch C3 at time t41, pre-servo activation of the clutch C1 at time t42, and sweep apply control of the clutch C3 at time t43 in the embodiment are the same as the processing at time t21, time t22, and time t23 in the example of FIG. 9, and thus descriptions of them are omitted. In the embodiment, as illustrated in FIG. 11, the target gear ratio Gr* (target input shaft rotation speed Nin*) reaches the shift point Gdown of 6-4 shifting at time t44, but when 4-5 shifting is predicted from the target gear ratio change rate Vgr and the C3 pre-servo activation time (time t45), the 6-4 shifting is canceled. At this time, since the sweep apply control of the clutch C3 is performed, this control is continued and the pre-servo activation of the clutch C1 is canceled. The clutch C3 is completely engaged at a relatively earlier timing after time t46 when the target gear ratio Gr* reaches the shift point Gup of 4-5 shifting, thereby completing the 6-5 shifting. On the other hand, in the comparative example, as illustrated in FIG. 12, pre-servo activation of the clutch C3 is started after time t54 when 6-4 shifting is canceled and 6-5 shifting becomes effective (corresponding to time t46 in FIG. 11). Thus, it can be understood that completion of the shifting delays.

With the transmission apparatus of the embodiment as described above, the target gear ratio Gr* is set to change linearly with respect to changes in the accelerator operation amount Acc and the vehicle speed V. Downshift is performed when this target gear ratio Gr* reaches the shift point Gdown on the downshift side, and upshift is performed when the target gear ratio Gr* reaches the shift point Gup. Based on the target gear ratio change rate Vgr which is a rate of change in the target gear ratio Gr* and the pre-servo activation time Tps, a timing earlier by the pre-servo activation time Tps of the next shifting than the timing when the current target gear ratio Gr* reaches the shift point Gdown, Gup is estimated, and the pre-servo activation is started at this timing. Thus, when the target gear ratio Gr* reaches the shift point Gdown, Gup, the hydraulic pressure supplied to the hydraulic servo of a necessary clutch (brake) can be increased immediately to engage this clutch (brake) by sweep apply control. As a result, the shifting can be completed quickly, thereby achieving traveling performance.

In the transmission apparatus of the embodiment, the predicted gear ratio Gps after pre-servo activation is calculated based on the target gear ratio Gr*, the target gear ratio change rate Vgr, and the pre-servo activation time Tps. However, the predicted gear ratio Gps after pre-servo activation may be calculated by also considering a target gear ratio change acceleration obtained by differentiating the target gear ratio change rate Vgr.

In the transmission apparatus of the embodiment, pre-servo activation on the downshift side is started when the predicted gear ratio Gps after pre-servo activation is equal to or larger than the shift point Gdown, and pre-servo activation on the upshift side is started when the predicted gear ratio Gps after pre-servo activation is equal to or smaller than the shift point Gup. However, considering occurrence of a small error in the pre-servo activation time Ts, pre-servo activation on the downshift side may be started when the predicted gear ratio Gps after pre-servo activation is at a predetermined width before the shift point Gdown, or pre-servo activation on the upshift side may be started when the predicted gear ratio Gps after pre-servo activation is at a predetermined width before the shift point Gup. In this case, the predetermined width may be decided based on the range of an error in the pre-servo activation time Tps.

In the transmission apparatus of the embodiment, as illustrated in steps S280, S290, S340, S350 of the pre-servo activation control routine of FIG. 7, the predicted gear ratio Gps after pre-servo activation, which is a predicted value of the target gear ratio when the pre-servo activation time Tps passes from the current target gear ratio Gr*, is calculated with the formula (1). Then pre-servo activation on the downshift side is started when this predicted gear ratio Gps after pre-servo activation is equal to or larger than the shift point Gdown, and pre-servo activation on the upshift side is started when the predicted gear ratio Gps after pre-servo activation is equal to or smaller than the shift point Gup. However, as illustrated in a pre-servo activation control routine of a modification example in FIG. 13, regarding the pre-servo activation on the downshift side, instead of steps S280, S290, a predicted time Ts to reach the shift point, which is a predicted time to reach the shift point Gdown from the current target gear ratio Gr*, may be calculated with the following formula (2) based on the target gear ratio Gr*, the target gear ratio change rate Vgr, and the shift point Gdown (step S280B). When this predicted time Ts to reach the shift point is equal to or shorter than the pre-servo activation time Tps (step S290B), the pre-servo activation on the downshift side may be started (step S360). Regarding the pre-servo activation on the upshift side, instead of steps S340, S350, a predicted time Ts to reach the shift point, which is a predicted time to reach the shift point Gup from the current target gear ratio Gr*, may be calculated with the following formula (3) based on the target gear ratio Gr*, the target gear ratio change rate Vgr, and the shift point Gup (step S340B). When this predicted time Ts to reach the shift point is equal to or shorter than the pre-servo activation time Tps (step S350B), the pre-servo activation on the upshift side may be started (step S360). For the predicted time Ts to reach the shift point, similarly to the predicted gear ratio Gps after pre-servo activation, a target gear ratio change acceleration may be considered in addition to the target gear ratio change rate Vgr, $$Ts = (Gdown - Gr^*)/Vgr \quad (2)$$

$$Ts = (Gup - Gr^*)/Vgr \quad (3)$$

In the transmission apparatus of the embodiment, the target gear ratio Gr* for efficiently operating the engine 12 is set based on the accelerator operation amount Acc and the vehicle speed V. However, the target gear ratio Gr* may be set based only on the accelerator operation amount Acc. Also, the target gear ratio Gr* may be set based only on the vehicle speed V. Further, the target gear ratio Gr* may be set based on torque required for traveling instead of the accelerator operation amount Acc. The target gear ratio Gr* is not limited to setting of a gear ratio for efficiently operating the engine 12, and may be set under any rule, such as setting a gear ratio giving a higher priority to output of power over efficiency.

In the transmission apparatus of the embodiment, the six-speed automatic transmission 20 is used, but the shift speeds are not limited to six speeds. Two to five shift speeds may be employed, or seven or more shift speeds may be employed.

In this embodiment, the present invention has been described in the form of a transmission apparatus. However, the present invention may be described in the form of a shift control apparatus controlling an automatic transmission.

Here, the correspondence between the major elements of the embodiment and the major elements of the invention described in the Summary of the Invention section will be described. In the embodiment, the automatic transmission 20 corresponds to the "stepped transmission", the hydraulic circuit 50 corresponds to the "hydraulic actuator", the ATECU 29 performing the processing in steps S100, S110 of the shift control routine in FIG. 4 and the processing in steps S200, S210 of the pre-servo activation control routine in FIG. 7 corresponds to the "gear ratio setting unit", the ATECU 29 performing the processing in steps S120 to S170 of the shift control routine corresponds to the "shift speed change determining unit", the ATECU 29 performing the processing in steps S200 to S350 of the pre-servo activation control routine corresponds to the "shift speed change predicting unit", the ATECU 29 performing the processing in step S360 of the pre-servo activation control routine and steps S180, S190 of the shift control routine corresponds to the "shift control unit", and the pre-servo activation time Tps needed for the pre-servo activation control corresponds to the "engagement preparation time". It should be noted that the embodiments are examples for specifically describing the invention described in the Summary of the Invention section, and thus the correspondence between the major elements of the embodiments and the major elements of the invention described in the Summary of the Invention section does not limit the elements of the invention described in the Summary of the Invention section. That is to say, the invention described in the Summary of the Invention section should be construed based on the description in that section, and the embodiments are merely specific examples of the invention described in the Summary of the Invention section.

In the foregoing, the embodiments of the present invention has been described, but the present invention is not limited to such embodiments at all. It is needless to mention that the present invention can be implemented in various modes within the range not departing from the spirit of the invention.

The present invention can be used in industry of manufacturing control apparatuses of automatic transmissions.

What is claimed is:

1. A shift control apparatus controlling a stepped transmission that is mounted in a vehicle and changes a shift speed by switching an engagement state of a friction engagement element by driving a hydraulic actuator, the shift control apparatus comprising:
   a gear ratio setting unit that sets a gear ratio to change gradually with respect to a change in a traveling state;
   a shift speed change determining unit that determines a change of shift speed by comparing the set gear ratio with a reference gear ratio corresponding to each shift speed;
   a shift speed change predicting unit that predicts in advance a change of shift speed by the shift speed change determining unit based on the set gear ratio, a rate of change in the set gear ratio, and an engagement preparation time which is a time needed for engagement preparation of the friction engagement element; and
   a shift control unit that controls the hydraulic actuator so that engagement preparation of a friction engagement element to be engaged is performed when a change of shift speed is predicted by the shift speed change predicting unit and places the friction engagement element in a standby state, and controls the hydraulic actuator so that a hydraulic pressure needed for engaging the friction engagement element is supplied to a hydraulic servo of the friction engagement element when a change of shift speed is determined by the shift speed change determining unit.

2. The shift control apparatus according to claim 1, wherein the gear ratio setting unit is capable of setting the gear ratio as a gear ratio between a reference gear ratio of a predetermined shift speed and a reference gear ratio of a shift speed adjacent to the predetermined shift speed.

3. The shift control apparatus according to claim 1, wherein the shift speed change predicting unit calculates an amount of change in a gear ratio during the engagement preparation time based on a rate of change in the set gear ratio and the engagement preparation time, calculates a predicted gear ratio which is a gear ratio predicted at a time when the engagement preparation time passes based on a sum of the amount of change in the calculated gear ratio and the set gear ratio, and predicts a change of shift speed by comparing the calculated predicted gear ratio with an immediately close reference gear ratio in a direction of change in the set gear ratio.

4. The shift control apparatus according to claim 3, wherein the shift speed change predicting unit predicts, when the rate of change in the set gear ratio is negative, a change of shift speed when the predicted gear ratio becomes equal to or smaller than the immediately close gear ratio, and predicts, when the rate of change in the set gear ratio is positive, a change of shift speed when the predicted gear ratio becomes equal to or larger than the immediately close reference gear ratio.

5. The shift control apparatus according to claim 1, wherein the shift speed change predicting unit calculates, based on the set gear ratio, a rate of change in the set gear ratio, and an immediately close reference gear ratio in a direction of a change in the set gear ratio, a predicted time to reach the reference gear ratio which is a predicted time to reach the immediately close reference gear ratio from the set gear ratio, and predicts a change of shift speed by comparing the calculated predicted time to reach the reference gear ratio with the engagement preparation time.

6. The shift control apparatus according to claim 5, wherein the shift speed change predicting unit predicts a change of shift speed when the predicted time to reach the reference gear ratio becomes equal to or shorter than the engagement preparation time.

7. The shift control apparatus according to claim 1, controlling a stepped transmission that includes a plurality of friction engagement elements, and is capable of changing a shift speed by changing a combination of engagement and non-engagement of the plurality of friction engagement elements, wherein
   the engagement preparation time is defined to be a different time for each friction engagement element; and
   the shift speed change predicting unit predicts in advance a change of shift speed by the shift speed change determining unit based on the set gear ratio, a rate of change in the set gear ratio, and the engagement preparation time of an immediately close shift speed in a direction of a change in the set gear ratio.

8. A transmission apparatus, comprising:
   an automatic transmission; and
   a shift control apparatus controlling the automatic transmission that is mounted in a vehicle and changes a shift speed by switching an engagement state of a friction engagement element by driving a hydraulic actuator, the shift control apparatus comprising:
   a gear ratio setting unit that sets a gear ratio to change gradually with respect to a change in a traveling state;
   a shift speed change determining unit that determines a change of shift speed by comparing the set gear ratio with a reference gear ratio corresponding to each shift speed;
   a shift speed change predicting unit that predicts in advance a change of shift speed by the shift speed change determining unit based on the set gear ratio, a rate of change in the set gear ratio, and an engagement preparation time which is a time needed for engagement preparation of the friction engagement element; and
   a shift control unit that controls the hydraulic actuator so that engagement preparation of a friction engagement element to be engaged is performed when a change of shift speed is predicted by the shift speed change predicting unit and places the friction engagement element in a standby state, and controls the hydraulic actuator so that a hydraulic pressure needed for engaging the friction engagement element is supplied to a hydraulic servo of the friction engagement element when a change of shift speed is determined by the shift speed change determining unit.

* * * * *